(12) United States Patent
Kitamura

(10) Patent No.: US 7,903,230 B2
(45) Date of Patent: Mar. 8, 2011

(54) METHOD FOR PRODUCING LIQUID CRYSTAL DISPLAY CELL AND SEALING AGENT FOR LIQUID CRYSTAL DISPLAY CELL

(75) Inventor: Tadashi Kitamura, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 480 days.

(21) Appl. No.: 11/730,702

(22) Filed: Apr. 3, 2007

(65) Prior Publication Data

US 2007/0179221 A1 Aug. 2, 2007

Related U.S. Application Data

(62) Division of application No. 10/502,715, filed as application No. PCT/JP03/00958 on Jan. 31, 2003, now abandoned.

(30) Foreign Application Priority Data

Feb. 4, 2002 (JP) .................................. 2002-26430

(51) Int. Cl.
*G02F 1/1339* (2006.01)
*G02F 1/1341* (2006.01)
*G02F 1/13* (2006.01)
*C08L 31/00* (2006.01)
*B32B 7/12* (2006.01)

(52) U.S. Cl. ......... 349/190; 349/187; 349/189; 524/543; 156/327

(58) Field of Classification Search .............. 349/187, 349/189, 190; 524/543
See application file for complete search history.

(56) References Cited

U.S. PATENT DOCUMENTS

| 3,557,249 | A |   | 1/1971 | Dannels et al. |
| 4,331,795 | A |   | 5/1982 | Ukita et al. |
| 4,401,537 | A | * | 8/1983 | Chern et al. ............ 522/31 |
| 5,115,083 | A |   | 5/1992 | Piedrahita et al. |
| 5,515,188 | A | * | 5/1996 | Miles et al. ............ 349/84 |
| 5,596,023 | A |   | 1/1997 | Tsubota et al. |
| 5,596,024 | A |   | 1/1997 | Horie et al. |
| 5,631,332 | A | * | 5/1997 | Karasawa et al. ............ 525/504 |
| 5,898,041 | A |   | 4/1999 | Yamada et al. |
| 6,001,203 | A |   | 12/1999 | Yamada et al. |
| 6,013,339 | A |   | 1/2000 | Yamada et al. |
| 6,219,126 | B1 |  | 4/2001 | Von Gutfeld |
| 2002/0176046 | A1 | * | 11/2002 | Kitamura et al. ............ 349/153 |
| 2003/0147034 | A1 |   | 8/2003 | Kojima |

FOREIGN PATENT DOCUMENTS

| EP | 0730188 A2 |   | 9/1996 |
| EP | 1293536 A  |   | 3/2003 |
| GB | 2037784 A  | * | 7/1980 |
| JP | 55-116773 A |  | 9/1980 |
| JP | 06-160872 A |  | 6/1994 |
| JP | 07-013173 A |  | 1/1995 |
| JP | 09-005759 A |  | 1/1997 |
| JP | 9-143433 A  |  | 6/1997 |
| JP | 11-049983 A |  | 2/1999 |
| JP | 11-143395 A |  | 5/1999 |
| JP | 11133438 A | * | 5/1999 |
| JP | 2001-064483 A | | 3/2001 |
| JP | 2001-100224 A | | 4/2001 |
| JP | 2001-133794 A | | 5/2001 |
| KR | 1994-001716 B | | 3/1994 |
| WO | 01/98411 A | | 12/2001 |

OTHER PUBLICATIONS

English translation of JP 11133438, Miyata et al, May 21, 1999.*
Tech Data for "Bisphenol A Diglycidyl Ether", Jun. 1999.*

* cited by examiner

*Primary Examiner* — Vasu Jagannathan
*Assistant Examiner* — Karuna P Reddy
(74) *Attorney, Agent, or Firm* — Buchanan Ingersoll & Rooney PC

(57) ABSTRACT

A method for producing a liquid crystal display cell comprising processes of applying a sealing agent on a sealing portion of at least one liquid crystal display cell substrate, dropping liquid crystal on the substrate, and bonding substrates to each other under vacuum, wherein the sealing agent comprising a material to be cured and a curing agent is applied to the sealing portion without mixing the material to be cured and the curing agent, and then the substrates are bonded to each other under vacuum at room temperature to cure the sealing agent, is disclosed. A sealing agent for a liquid crystal display cell wherein the above material to be cured comprise a radically polymerizable resin and an organic peroxide, and the above curing agent comprises a radically polymerizable resin and a decomposition accelerator, is also disclosed.

2 Claims, No Drawings

METHOD FOR PRODUCING LIQUID CRYSTAL DISPLAY CELL AND SEALING AGENT FOR LIQUID CRYSTAL DISPLAY CELL

CROSS REFERENCE TO RELATED APPLICATION

This application is a divisional of application Ser. No. 10/502,715, filed Jul. 29, 2004, now abandoned which is a §371 of PCT/JP03/00958, filed Jan. 31, 2003, which in turn claims priority to Japanese Application No. 2002-26430, filed Feb. 4, 2002, the disclosures of all of which are incorporated herein by reference in their entirety.

TECHNICAL FIELD

The present invention relates to a novel method for producing liquid crystal display cells and to a sealing agent for liquid crystal display cells.

BACKGROUND ART

Liquid crystal display cells are widely used as display elements which consume low energy, and there has been progress in the enlargement of the size of the elements together with the improvement of their performance. In general, in producing liquid crystal display cells, a method (an empty cell-forming method) in which a so-called empty cell is formed by sticking a transparent liquid crystal display cell substrate (hereinafter, referred to as substrate) with a sealing agent for liquid crystal display cell (hereinafter, sealing agent) and then a liquid crystal-forming compound is injected into this empty cell under vacuum, is used. However, there are problems in that it takes an extremely long time to produce a large-size liquid crystal display cell, since a liquid crystal-forming compound having a relatively high viscosity is needed to be inserted. Therefore, at present, a method (a liquid crystal-dropping and sealing method) in which a liquid crystal-forming compound is laminated on a transparent substrate, a sealing agent is applied to the peripheral portion of the substrate, and then the substrate is stuck with the other substrate under vacuum by evacuation of air, and the sealing agent is heated or photocured to form a liquid crystal display cell.

Examples of a known thermosetting sealing agent such as single liquid epoxy resin compositions are disclosed in Japanese Unexamined Patent Application Publication Nos. 2001-064483 and 2001-100224. Examples of a photocuring sealing agent are disclosed in Japanese Unexamined Patent Application Publication No. 6-160872. On the other hand, the disclosure of an acrylate resin composition which can be cured by a two liquid-unmixed contact and can seal the liquid crystal has not yet been made.

Meanwhile, a liquid crystal-dropping and sealing method as disclosed in Japanese Unexamined Patent Application Publication No. 2001-133794 and No. 9-5759 is a good method that can be applied to even large-sized liquid crystal display cells. However, in a method of curing with light, the light does not always pass through the portion required to form elements such as black matrix or electrode, whereby the sealing agent is not sufficiently cured, or it takes long time to cure the sealing agent. So thus, problems such as photo-degradation of the liquid crystal occur additionally. Also, in thermosetting method, since the liquid crystal display cell is subject to a high temperature for sufficient curing, problems such as the distortion of the cell in addition to thermal deterioration of the liquid crystal are caused. And there has been a problem in that the liquid crystal is contaminated with the conventional sealing agent. Further, in both methods as described above, there has been a problem in that large amount of energy should be consumed by heating the whole portion or by irradiating light over the whole portion.

Accordingly, an object of the present invention is to provide a novel method for producing a liquid crystal display cell capable of efficiently provide the large or small liquid crystal display element having sufficient high reliability and high quality within a given time without any particular difference from the conventional liquid crystal-dropping and sealing method, which does not substantially require photocuring or thermosetting process and satisfying so called high productivity, little energy and high quality durability, and a novel sealing agent which can be suitably used of said method.

DISCLOSURE OF INVENTION

In order to solve the above problems, the present inventors examine the problems in earnest, and then the inventors found that a liquid crystal display cell with excellent performance and without the above problems could be produced by a specific method, and thus the present invention has been completed.

That is, the present invention relates to a method for producing a liquid crystal display cell comprising processes of applying a sealing agent to a sealing portion of at least one liquid crystal display cell substrate, dropping liquid crystal on the substrate, and bonding substrates to each other under vacuum, wherein the sealing agent comprising a material to be cured and a curing agent is applied to the sealing portion without mixing the material to be cured and the curing agent, and then the substrates are bonded to each other under vacuum at room temperature to cure the sealing agent.

The present invention also relates to a sealing agent for a liquid crystal display cell wherein the material to be cured comprises a) a radically polymerizable resin and b) an organic peroxide, and the curing agent comprises a) a radically polymerizable resin and c) a decomposition accelerator.

BEST MODE FOR CARRYING OUT THE INVENTION

In the method for producing liquid crystal display cells according to the present invention, as a radical curing type and two-components sealing agent, the material to be cured and a curing agent are prepared, respectively, and the sealing agent is evenly applied to the sealing portion of at least one liquid crystal display cell substrate in a frame pattern without premixing each of them. Then, liquid crystal is dropped on the inner side of the sealing portion of the substrate, and then transferred to the vacuum chamber, and the air is evacuated so as to reach a vacuum in a range of 0.1 to 50 Pa, the pair of substrates are bonded to each other, and then the sealing agent is cured at room temperature without applying the external energy.

Examples of the substrate include glass substrates such as quartz and plastic substrates. Cell fabrication can involve any combination thereof. For example, the combination may include glass/glass combination, plastic/glass combination or plastic/plastic combination. The present invention shall not be restricted by any known pretreatment process or post-treatment process for the substrate. Examples of the pretreatment processes include a transparent electrode, an alignment film, color element, a thin film transistor element, a protective film for thin film transistor element, black matrix, the in-plane coating of the gap controller, etc. The kinds of the plastic substrate are not particularly restricted. For example, polycarbonate, polyetherketone, polyester, polyethersulfone, etc., can be mentioned.

The two-components sealing agent applied to the substrate is used in the mass ratio with the material to be cured: the curing agent in a range from (3:1) to (1:3), preferably, in a range from (1.1:1) to (1:1.1). When the range from (3:1) to (1:3) is used, the curing reliability of the sealing agent can be assured, and thus is preferred.

The method for applying the sealing agent comprising a material to be cured and a curing agent on a pair of substrates may include the coating methods (a) or (b) as follows:

(a) a method wherein by using a dispenser coating or a screen printing, a material to be cured is applied to the sealing portion of one substrate, while a curing agent is applied to the sealing portion of the other substrate.

(b) a method wherein a material to be cured and a curing agent are dispensed a sealing portion on the side of any one of substrates to render double coating.

The coating amount of the sealing agent comprising a material to be cured and a curing agent is in a range of 0.5 to 5 mm, preferably 0.5 to 2 mm, more preferably 0.7 to 1.2 mm of the resulting sealing width after the cell fabrication. It is preferable that the resulting sealing width be 0.5 to 5 mm, because the generation of sealing pass during cell fabrication can be inhibited reproducibly.

The liquid crystal may be optionally selected depending on the purpose of the liquid crystal display element, and a nematic liquid crystal and a ferroelectric liquid crystal, etc. may be mentioned as a preferred example.

The dropping amount of the liquid crystal per one cell, when the theoretical amount of the sealing volume of the celled liquid crystal as 100, is 95 to 110 volume %, preferably 97 to 105 volume % and more preferably 99 to 102 volume %. A dropping amount controlled to 95 to 110 volume % can secure the homogenization of display quality and the stable production of the liquid crystal display. The dropping position in the seal frame shall not be restricted, and the dropping may be one drop or multi-drops such as two or more drops. Depending on the size of the display panel and the viscosity of the liquid crystal itself and the like, the dropping number and the dropping position may be optionally selected, and shall not be specially restricted.

Then, in a process of bonding the substrates under vacuum, the substrates are inserted into the vacuum chamber, and the air is evacuated to reach a vacuum in a range of 0.1 to 50 Pa, the pair of substrates is bonding to each other with a good accuracy, and then the sealing agent is cured at room temperature without adding external energy.

When the substrates are inserted into the vacuum chamber, the upper and the lower sides of the two facing substrates are located horizontally without contacting each other, the substrate on which the liquid crystal has been dropped is inserted at the downward portion without reversing, and then the substrates are fixed.

Before and after the insertion into the vacuum chamber, when the substrate on which the liquid crystal has been dropped is tilted for a long time and vertically handled, there is a risk of leakage caused by the bleeding of the liquid crystal or the contamination of the perimeter, and thus it is not preferred. Further, when the substrate on which the liquid crystal has been dropped is reversed to 180° and handled, the liquid crystal is leaked and thus is not preferred.

The vacuum degree during bonding is in a range of 1 to 50 Pa, preferably in a range of 1 to 10 Pa. It is preferable that when the degree is 50 Pa or less, a liquid crystal display cell having a high quality be produced without the entry of a bubble void.

In the process of bonding the substrates under vacuum, a device capable of maintaining initially the two facing substrates in non-contact under the vacuum chamber, evacuating air to reach a vacuum, and bonding precisely the substrate is used. The present invention shall not be limited to the above operating mechanism of the device or the specification thereof and the like.

The general method for banding the substrates under vacuum includes, for examples, the method for sealing cell under vacuum as disclosed in Japanese Unexamined Patent Application Publication No. 8-190099 [the title of the invention: A method for producing liquid crystal display device and a device for producing liquid crystal display device] and the like.

The above external energy is one that is provided from the outside, including the compulsory heating from the outside, the compulsory irradiation of the visible light, the compulsory irradiation of UV light, the compulsory irradiation of the electron beam and the like, and promotes curing. Therefore, the meaning of the description that external energy is not added, is that any especially strong irradiation of the energy such as heating and light from the outside are not needed. Also, the involvement of extremely slight heat conduction or heat radiation, or extremely poor leakage of illumination light source the lightening, from the device or environment used are inevitably involved in the process of operation, and thus, it is not included in the description of external energy.

In the method for producing liquid crystal display cell according to the present invention, the sealing agent is cured at the substantially same time that the laminated cell is formed under vacuum, without adding the external energy. However, it does not mean that in the process before and after the cell fabrication, the method accompanied by the compulsory heating from the outside is entirely denied or excluded. For example, for the purpose of maximum shortening or completion of curing, after cell fabrication, the heating-incubation process at 100° C. or less, or the photoirradiation-incubation process, may be used together.

The sealing agent for the liquid crystal display cell (hereinafter, sealing agent) according to the present invention is a two-components sealing agent comprising a material to be cured and a curing agent, which can be cured by the contact of the two-liquid at room temperature.

As a base resin, a) a radically polymerizable resin is used, and in the material to be cured, a compound which generates the radical which is decomposed by the accelerator, for example b) an organic peroxide, is included; and in the curing agent, as a compound which promotes the curing, c) a decomposition accelerator is presented, which accelerates the decomposition reaction of b) an organic peroxide.

In the sealing agent according to the present invention the material to be cured comprises a) 30 to 94.4 mass % of a radically polymerizable resin having a polystyrene-reduced number average molecular weight of 300 to 10000, as a radically polymerizable resin, b) 0.5 to 10 mass % of an organic peroxide having a 10 hour-half life temperature at least 120° C., e) 5 to 50 mass % of an inorganic filler and f) 0.1 to 5 mass % of a silane coupling agent, and the curing agent comprises a) 30 to 94.4 mass % of a radically polymerizable resin having a polystyrene-reduced number average molecular weight of 300 to 10000, as a radically polymerizable resin, c) 0.5 to 10 mass % of a decomposition accelerator for the organic peroxide, e) 5 to 50 mass % of an inorganic filler and f) 0.1 to 5 mass % of a silane coupling agent, and the mass ratio of the material to be cured: the curing agent is in a range of (3:1) to (1:3), preferably, of (2:1) to (1:2), more preferably, of (1.1:1) to (1:1.1).

It is preferable that a) the radically polymerizable resin be an acrylate resin having a polystyrene-reduced number average molecular weight of 300 to 10000, or allyl resin and d) a polyvalent mercapto compound.

Further, it is preferable that the sealing agent wherein the material to be cured and the curing agent be each independently combined with 5 to 25 mass % of g) a liquid rubber and/or h) a rubber fine particle, based on the total amount.

Next, the components of the sealing agent according to the present invention will be explained in detail.

a) Radically Polymerizable Resin

A composition comprising an acrylate resin a-1) having a polystyrene-reduced number average molecular weight in a range of 300 to 10000, which is determined by means of a gel permeation chromatography, and/or a-2) an allyl resin and d) a polyvalent mercapto compound, is used.

A two-components sealing agent comprising a-1) acrylate resin is preferred since it has a rapid curing speed and a high sealing property of the liquid crystal. It is preferable that by controlling a) radically polymerizable resin to have the number average molecular weight of 300 or more, the radically curable two-components sealing agent having a low generation of outgas be obtained. Radically curable two-components sealing agent which is produced by controlling its number average molecular weight within 10000 or less, is preferably used as it is good at non-contaminating the liquid crystal and the handling work stability of the sealing agent.

a-1) Acrylate Resin

This resin means methacrylate and/or polyvalent acrylate, having two or more radically polymerizable unsaturated groups in one molecule (hereinafter, referred to merely as polyvalent (meth)acrylate), and the resin incompatible with the liquid crystal can be selectively used.

The polyvalent (meth)acrylates include, 1,3-butyleneglycol diacrylate, 1,3-butyleneglycol dimethacrylate, 1,4-butanediol diacrylate, 1,4-butanediol dimethacrylate, 1,5-pentanediol diacrylate, 1,5-pentanediol dimethacrylate, 3-methyl-1,5-pentanediol diacrylate, 3-methyl-1,5-pentanediol dimethacrylate, 1,6-hexanediol diacrylate, 1,6-hexanediol dimethacrylate, neopentylglycol diacrylate, neopentylglycol dimethacrylate, pentaerythritol triacrylate, pentaerythritol trimethacrylate, pentaerythritol tetraacrylate, pentaerythritol tetramethacrylate, dipentaerythritol tetraacrylate, dipentaerythritol hexaacrylate, dipentaerythritol tetramethacrylate, dipentaerythritol hexamethacrylate, 1,8-octanedioldimethacrylate, 1,8-octanedioldiacrylate, 1,9-nonanedioldiacrylate, 1,9-nonanedioldimethacrylate, polyethylene glycol dimethacrylate, polyethylene glycol diacrylate, polypropylene glycol dimethacrylate, polypropylene glycol diacrylate, dimethacrylate of tris(2-hydroxyethyl)isocyanurate, diacrylate of tris(2-hydroxyethyl)isocyanurate, bisphenol A type and/or bisphenol F type dimethacrylic ester, bisphenol A type and/or bisphenol F type diacrylic ester, diacrylate and/or dimethacrylate of diol obtained by the addition of 4 moles or more of ethylene oxide or propylene oxide to 1 mole of neopentyl glycol, diacrylate and/or dimethacrylate of diol obtained by the addition of 2 moles or more of ethylene oxide or propylene oxide to 1 mole of bisphenol A and/or bisphenol F or bishphenol AD, di or triacrylate or trimethacrylate of triol obtained by the addition of 3 moles or more of ethylene oxide or propylene oxide to 1 mole of trimethylol propane, triamalylate and/or trimethacrylate of triol obtained by the addition of 4 moles or more of ethylene oxide or propylene oxide to 1 mole of trisphenol, tris(2-hydroxyethyl)isocyanurate triacrylate and/or trimethacrylate, trimethylol propane triacylate, trimethylol propane trimethacrylate, caprolacton modified trismethacryloxyethyl isocyanurate, caprolacton modified trisacryloxyethyl isocyanurate, polyvalent acrylate of alkyl modified dipentaerythritol, polyvalent methacrylate of alkyl modified dipentaerythritol, polyvalent acrylate of caprolacton modified dipentaerythritol, polyvalent methacrylate of caprolacton modified dipentaerythritol, hydroxypyvalic neopentylglycol diacrylate, caprolactone modified hydroxypyvalic neopentylglycol diacrylate, ethyleneoxide modified phosphoric diacrylate, ethyleneoxide modified phosphoric dimethacrylate, ethyleneoxide modified alkylated phosphoric diacrylate, ethyleneoxide modified aklylated phosphoric dimethacrylate, polyester polyvalent acrylate, polyester polyvalent methacrylate, polyether polyvalent acrylate, polyether polyvalent methacrylate, polyether polyester polyvalent acrylate, polyether polyester polyvalent methacrylate, polyurethane polyvalent acrylate, polyurethane polyvalent methacrylate, a bisphenol A type and/or a bisphenol F type epoxy diacrylate ester, the above type epoxy dimethacrylate ester, novolac epoxy polyvalent acrylate, novolac epoxy polyvalent methacrylate, cresol novolac epoxy polyvalent acrylate, cresol novolac epoxy polyvalent methacrylate and the like.

The polyvalent (meth)acrylates preferably include at least one (meth)acrylate selected from dipentaerythritol tetramethacrylate, dipentaerythritol hexamethacrylate, polyurethane polyvalent acrylate, polyurethane polyvalent methacrylate, bisphenol A type and/or bisphenol F type epoxy diacrylate ester, the same type epoxy dimethacrylate ester, novolac epoxy polyvalent acrylate, novolac epoxy polyvalent methacrylate, cresol novolac epoxy polyvalent acrylate, cresol novolac epoxy polyvalent methacrylate and the like.

Polyvalent (meth)acrylate, in view of the incompatibility (prevention from contamination to the liquid crystal) with the liquid crystal, has the polystyrene-reduced number-average molecular weight in a range of 300 to 8000, preferably in a range of 350 to 5000, which is determined by a gel permeation chromatography.

The amount of a-1) acrylate resin in the material to be cured and the curing agent is in a range of 30 to 94.4 mass %, preferably, 40 to 85 mass %. If the amount is 94.4 mass % or less, the radically curing activity can be substantially obtained. And if the amount is 30 mass % or more, the sealing suitability of the liquid crystal can be substantially assured.

It is preferable to select polyvalent (meth)acrylate that is highly purified by water-washing and the like.

To adjust the viscosity of polyvalent (meth)acrylate, an amount of 0.1 to 10 mass % of radically polymerizable monomer having poor volatility may be used in the material to be cured or the curing agent.

It is not preferable to use radically polymerizable monomer having volatility, because makes it difficult to ensure the prevention from contamination to the liquid crystal, and tends to cause the decreases in the display quality of the resulting liquid crystal display element.

If the radically polymerizable monomer having high volatility is contained therein, it often causes the dryness of the plate or plugging in the screen printing, plugging in the dispenser coating, and the like. Boiling of the sealing agent during the cell fabrication under vacuum often tends to take place, resulting in the undesired phenomena such as sealing pass, sealing distortion, the distortion of the orientation of the liquid crystal, or the contamination of the liquid crystal by the outgas. Accordingly, it is preferable to use the radically polymerizable monomer having poor volatility as a radically polymerizable monomer to be used together.

As the radically polymerizable monomer having poor volatility, those having an excellent incompatibility with the liquid crystal are used. Examples thereof are acrylic acid, methacrylic acid and alkyl ester derivatives thereof, unsaturated dicarboxylic acids represented by maleic anhydride, maleic acid, itaconic anhydride, itaconic acid, fumaric acid and the like, and monoesters or diesters derived from said dicarboxylic acids and one of the primary to tertiary alkyl alcohols represented by the carbon atoms having an integer of from 1 to 6 in the alkyl group, aromatic unsaturated monomers represented by styrene, vinyltoluene, vinylphenol, isopropenylphenol, α-methylstyrene, p-methylstyrene and the like, radically polymerizable amides represented by acrylamide or methacrylamide and the like, or derivatives thereof, N-methylacrylamide or the derivatives thereof, N-hydroxymethylacrylamides, N-hydroxyethylacrylamides and the alkyl esterized derivatives thereof, other N-vinyl-2-pyrrolidone, acryloylmorpholine, vinylimidazole, N-vinylcaprolactame, vinyl acetate and the like.

As the acrylic acid alkyl ester derivatives and methacrylic acid alkyl ester derivatives, the alkyl substituents include, methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone modified tetrahydrofurfuryl, isobornyl, dicyclopentanyl, dicyclopentenyl, dicyclopentenyloxyethyl and the like, and the preferred examples thereof include, for examples, 2-hydroxyethyl and 2-hydroxypropyl. The particularly preferred examples thereof include, for example, 2-hydroxyethylacrylate, 2-hydroxyethylmethacrylate, 2-hydroxypropylacrylate and 2-hydroxypropylmethacrylate.

The method for determining the kinds and the proportions of the polyvalent (meth)acrylate in the curing agent or the material to be cured, i.e., a-1) acrylate resins, shall not be specifically restricted, but any proper combinations of solvent extract fractionation, NMR spectral identification, gas chromatography, distillation separation and the like, may be mentioned as appropriate. As the method for determining the kinds and the proportions of the polyvalent (meth)acrylate in the sealing agent, for example, any combination of pyrolysis gas chromatography-mass spectrometry, solid NMR methods, may be mentioned as appropriate.

a-2) Allyl Resin

Examples thereof are at least one resin selected from polyvalent allyl carbonate compounds, polyvalent allyl phthalate compounds, and polyvalent allyl ether compounds, having an excellent incompatibility with the liquid crystal. It is preferable to use those purified so as to have a high purity by water-washing.

The polyvalent allyl carbonate compounds, for example, include diallyl carbonate compounds represented by the following general formula (1):

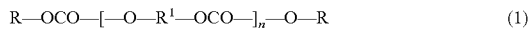

R—OCO—[—O—R$^1$—OCO—]$_n$—O—R        (1)

wherein, R is an allyl group, R$^1$ is a divalent aliphatic group or an aromatic group, and n is an integer of from 1 to 9. The examples of the preferred diallylcarbonate compounds include polyethleneglycol diallylcarbonate, polypropyleneglycol diallylcarbonate.

An example of polyvalent allylphthalate compounds includes diallylphthalate oligomer. And the examples of polyvalent allyl ether compounds include at least one compound selected from neopentylglycol diallylether, trimethylolpropanediallyl ether, pentaerythritol triallylether, pentaerythritol tetraallylether and the like.

The amount of the composition comprising a-2) allyl resin and d) the polyvalent mercapto compounds in the material to be cured and the curing agent is in a range of 30 to 94.4 mass %, preferably, 40 to 85 mass %. The radically curing activity can be substantially obtained at 94.4 mass % or less. The sealing suitability of the liquid crystal can be substantially assured at 30 mass % or more.

The composition of a-2) allyl resin and d) the polyvalent mercapto compounds is described in the column for explanation about the component d) as shown below. And the term molecular weight means the number-average molecular weight of the entire composition comprising the component d).

b) Organic Peroxide

The material having a low degree of influence on the liquid crystal can be selected among the known materials. It is preferable to use at least one peroxide selected from dialkyl peroxides and hydroperoxides, having a 10 hour-half life temperature of at least 120° C. or higher since the pot life-suitability of the material to be cured can be substantially secured. The specific example of the b) organic peroxide includes preferably cumene hydroperoxide.

The amount of b) organic peroxide in the material to be cured is in a range of 0.5 to 10 mass %, preferably, 1 to 5 mass %. If the amount is 0.5 mass % or more, the radically curing activity can be substantially obtained. If the amount is 10 mass % or less, the pot life-suitability and the sealing suitability of the liquid crystal can be substantially assured.

In the present invention, likewise b) organic peroxide, the known materials which generate active radicals when thermally decomposing, for example, at least one material selected from disulfide compounds, tetrasulfide compounds, benzoin and their derivatives, and azo compounds and the like, may be used in the material to be cured as described above, together with b) organic peroxides, within a range which does not cause damage to the working effects.

c) Decomposition Accelerator

As c) decomposition accelerator for organic peroxide, materials having a low adverse influence on the liquid crystal and having an excellent effectiveness of prevention from contamination to the liquid crystal can be selected among known materials.

Examples thereof are at least one agent selected from thiourea derivatives, mercaptobenzimidazoline, transition metal organic complexes, amine compounds, phosphate and/or phosphite compounds, L-ascorbic acid, toluidine derivatives, aniline derivatives and the like. Preferred examples thereof include thiourea derivatives and/or mercaptobezimidazoline, and the like.

Thiourea derivatives include, for example, N,N'-dimethylthiourea, tetramethylthiourea, N,N'-diethylthiourea, N,N'-dibutylthiourea, benzoylthiourea, acetylthiourea, ethylenethiourea, N,N'-diethylenethiourea, N,N'-diphenylthiourea, N,N'-dilaurylthiourea and the like. Preferred examples include tetramethylthiourea or benzoylthiourea.

Transition metal organic complexes include, for example, cobalt naphthenate, vanadium naphthenate, copper naphthenate, iron naphthenate, manganese naphthenate, cobalt stearate, vanadium stearate, copper stearate, iron stearate and manganese stearate and the like.

Amine compounds include, for example, primary to tertiary alkylamines or alkylene diamines represented by the carbon atoms having an integer of from 1 to 18 in the alkyl group or the alkylene group, diethanolamine, triethanolamine, dimethylbenzylamine, trisdimethylaminomethylphenol, trisdiethylaminomethylphenol, 1,8-diazabicyclo(5,4,0)-undecene-7,1,8-diazabicyclo(5,4,0)-undecene-7,1,5-diazabicyclo(4,3,0)-nonene-5,6-dibutylamino-1,8-diazabicyclo(5,4,0)-undecene-7,2-methylimidazole, 2-ethyl-4-methylimidazole and the like.

Phosphate and phosphite compounds include, for example, methacryl phosphate, dimethcryl phosphate, monoalkylacidophosphate, dialkylphosphate, trialkylphosphate, dialkylphosphite, trialkylphosphite and the like.

Also, the toluidine derivatives include, for example, N,N-dimethyl-p-toluidine, N,N-diethyl-p-toluidine and the like.

Aniline derivatives include, for example, N,N-dimethylaniline, N,N-diethylaniline and the like.

Also, as c) decomposition accelerator, at least one of the above mentioned components may be used.

The amount of c) decomposition accelerator in the curing agent is in a range of 0.5 to 10 mass %, preferably, 1 to 5 mass %. If the amount is 0.5 mass % or more, the radically curing activity at room temperature can be substantially obtained. If the amount is 10 mass % or less, the pot life-suitability and the sealing suitability of the liquid crystal can be substantially assured.

d) Polyvalent Mercapto Compound

As d) polyvalent mercapto compounds which are essential when a-2) allyl resin is used as a base resin, materials having excellent effectiveness of prevention from contamination to the liquid crystal-forming compound, can be used.

At least one compound selected from bifunctional mercapto compounds, trifunctional mercapto compounds and tetrafunctional mercapto compounds, may be included, for example, it is preferable to use the compounds purified by water-washing.

Bifunctional mercapto compounds include, for example, ethylene glycol dimercaptopropionate, polyoxyethylene glycol dimercaptopropionate, propylene glycol dimercaptopropionate, polypropylene glycol dimercaptopropionate, tetramethylene glycol dimercaptopropionate, polyoxytetramethylene glycol dimercaptopropionate, neopentyl glycol dimercaptopropionate and the like. Trifunctional mercapto compounds include, for example, glycerine trimercaptopropionate, trimethylolpropane trimercaptopropionate, trismercaptoisocyanurate and the like. Tetrafunctional mercapto compounds include, for example, pentaerythritol tetrakis(2-mercaptoacetonate), pentaerythritol tetrakis(3-mercaptopropionate), pentaerythritol tetrakis(2-mercaptoisopropionate) and the like.

d) Polyvalent mercapto compounds in the material to be cured and the curing agent of which the base resin is allyl resin, respectively, contain mercapto group, per mole of ally group in the allyl resin, preferably in an amount of 0.3 to 1.1 moles, more preferably, 0.35 to 1 moles. If the amount is 0.3 to 1.5 moles, the rapid cure activity at room temperature and the sealing reliability to the substrate of the sealing agent can be substantially assured.

e) Inorganic Filler

The inorganic filler may be any one as long as it can be used as an inorganic filler in the electronic material field.

Examples thereof are silica and/or alumina having high purity, or titanium oxide, wherein a total content of alkali metals which is determined by an atomic absorption spectrometry of the decomposition products under a wet condition is 50 ppm or less, preferably 30 ppm or less and more preferably 15 ppm or less. Also, the filler has preferably a particle diameter at 99 mass % ($d^{99}$) obtained on a weight integration curve of 5 μm or less, which is determined by a particle size-measuring instrument using laser having a wavelength of 632.8 nm, and it has more preferably a weight average particle diameter ($d^{50}$) falling in a range of 0.005 to 1 μm, which is shown by a value at 50 mass % on the weight integration curve. The use of the inorganic filler having $d^{99}$ of 5 μm or less can substantially assure the narrow-gap property in the liquid crystal display cell.

In the material to be cured and the curing agent, e) inorganic filler is used in a range of 5 to 50 mass %, preferably 7 to 45 mass %, more preferably 10 to 40 mass %. If the content is 5 mass % or more, it is possible to elevate the coating workability of the sealing agent in screen printing or dispenser coating and is preferred. And, if the content is 50 mass % or less, it is possible to substantially secure the fluidity of the sealing agent and also secure screen printing workability or dispenser coating workability having a little coating distortion.

Also, the filler may be used after modified by grafting with f) a silane coupling agent as described below.

f) Silane Coupling Agent

Trialkoxysilane compounds or methyldialkoxysilane compounds or a partially hydrolyzated oligomers comprising 2 to 5 molecules of said silane compounds can be given as examples thereof. Given as preferred examples thereof are glycidoxy silanes represented by gamma-glycidoxypropyltrimethoxysilane and gamma-glycidoxypropyltriethoxysilane, aminosilanes represented by N-phenyl-gamma-aminopropyltrimethoxysilane, N-phenyl-gamma-aminopropyltriethoxysilane, N-phenyl-gamma-aminopropylmethyldimethoxysilane, N-phenyl-gamma-aminopropylmethyldiethoxysilane and the like, mercaptosilanes represented by gamma-aminopropyltrimethoxysilane and gamma-mercaptopropyltriethoxysilane and the like, isocyanaotesilanes represented by gamma-isocyanatopropylmethyldiethoxysilane, gamma-isocyanatopropyltriethoxysilane and the like. At least one selected from gamma-glycidoxypropyltrimethoxysilane, gamma-glycidoxypropyltriethoxysilane, N-phenyl-gamma-aminopropyltrimethoxysilane and gamma-isocyanatopropyltriethoxysilane is more preferred.

In the material to be cured and the curing agent, f) silane coupling agent is used in a range of 0.1 to 5 mass %. If the amount is 0.1 mass % or more, it is possible to assure the adhesive property of the sealing agent to the celled substrate. And, even the amount controlled to 5 mass % or more does not lead remarkable working effects superior to this, and 0.5 to 3 mass % is preferred.

g) Liquid Rubber

The rubber may have at least one functional group selected from isocyanato, epoxy, vinyl, carboxyl, hydroxyl, amino, acryloyl and the like. They are represented by liquid polybutadiene, liquid acrylonitrile-butadiene copolymer resin, liquid polyisoprene, liquid polybutene, liquid polyethylenepropylene rubber, liquid butyl rubber, liquid polyisobutylene, liquid chloroprene and the like.

h) Rubber Fine Particle

A silicone rubber fine particles a silicone-acrylic rubber fine particle, an acrylic rubber fine particle or a polyolefin rubber fine particle and the like, each having a softening point of −30° C. or lower and a primary particle diameter in range of 0.1 to 3 μm, may be mentioned.

g) Liquid rubber and/or h) rubber fine particle, are each independently presented in a range of 1 to 25 mass %, preferably 2 to 25 mass %, more preferably 5 to 20 mass %, based on the total amount of the material to be cured or the curing agent. If the amount is 1 to 25 mass %, it is possible to assure the adhesive property of the sealing agent to the substrate, and elevate the adhesive durability-reliability after the water resistant test for the liquid crystal display cell at 60 to 80° C.

As a two-component sealing agent of which the base resin is acrylate resin, it is preferable to use a sealing agent which comprises a material to be cured comprising a-1) acrylate resin and b) organic peroxide, and a curing agent comprising a-1) acrylate resin and c) decomposition accelerator.

As a two-component sealing agent of which the base resin is allyl type resin, it is preferable to use a sealing agent in a combination form, which comprises a material to be cured comprising a-2) allyl resin, d) polyvalent mercapto compound and b) organic peroxide, and a curing agent comprising a-2) allyl resin, d) polyvalent mercapto compound and c) decomposition accelerator for organic peroxide.

Also, to the sealing agent of the present invention, the incorporation of g) liquid rubber, h) rubber fine particle is preferred.

The method for determining the kinds and the proportions of a) radically polymerizable resin, b) organic peroxide, c) decomposition accelerator, and d) polyvalent mercapto compounds in the sealing agent, shall not be specially restricted, but any combinations of solvent extract fractionation, NMR spectral identification, infrared spectrometry, element analysis, liquid chromatography and the like, may be made. As the method for determining the kinds and the proportions of each of the constitutional components in the cured products of sealing agent, for example, any proper combinations of pyrolysis gas chromatography-mass spectrometry, solid NMR methods and the like, may be mentioned as appropriates.

Further in the sealing agent of the present invention, it is more preferable to contain the following i) gap-forming controller, j) conductive beads, k) photopolymerization initiator, l) an acrylpolymer fine particle having a high softening point, m) wax, n) radically polymerizable inhibitor and the like into the material to be cured and the curing agent, if necessary.

i) Gap-Forming Controller

The term means a substance which controls optionally and accurately a gap width of a liquid crystal display cell to a width of, for example, 3 to 7 µm. Examples thereof are vertically and horizontally symmetric inorganic particles or thermosetting polymer particles such as spherical or rugby ball particles and cylindrical fibers which are not deformed, dissolved or swollen depending on a base resin.

Examples of the above inorganic particles include spherical silica particles, spherical alumina particles, glass short fibers, metal short fibers and metal powders and the like. The organic gap-forming controller includes thermosetting polystyrene spherical particles, other phenol resin based thermosetting particles and benzoguanamine resin based thermosetting particles and the like.

j) Conductive Beads

Novel metal particle, novel metal alloy particle, lower metal particle, lower metal ally particle, other metal coating-like organic particle and metal coating-like insulating inorganic particle and the like may be included. The brand name "Micropal AU series" from Sekisui Fine Chemicals Co., Ltd. is commercially available and can be preferably used.

k) Photopolymerization Initiator benzyl, benzoinmethylether, acetophenone can be exemplified.

l) An acrylpolymer Fine Particle Having a High Softening Point

Methylesterpolymer polymethacrylate can be mentioned as an example.

m) Wax

Examples thereof are animal based naturally occurring wax, plant based naturally occurring wax, mineral material based naturally occurring wax, petroleum based wax, synthetic hydrocarbon based wax, modified wax, hydrogenated wax and the like. Among these waxes, wax having a melting point between 30° C. and 150° C. is preferred. Paraffin wax, carnauva wax, microcrystalline wax are more preferred.

n) Radically Polymerizable Inhibitor

Examples thereof are polyvalent phenol compounds represented by hydroquinone, methylhydroquinone, t-butylhydroquinone, hydroquinonemethylether, di-t-butyl-p-cresol, t-butylcatechol and the like, and phosphorous compounds and the like represented by phenothiazine, diphenylisodecylphosphate.

In the sealing agent according to the present invention the radically polymerizable resin used in the material to be cured or the curing agent, respectively, is an acrylate resin having polystyrene-reduced number-average molecular weight of 300 to 10000, and more preferably a highly purified acrylate resin having the resistivity of a range of $10^7$ to $10^{15}$ Ω·cm.

As the method of adjusting the sealing agent, a) a radically polymerizable resin, e) an inorganic filler and f) a silane coupling agent, and if necessary, g) a liquid rubber, h) a rubber fine particle in the material to be cured are mixed in the material to be cured, stirred mechanically and then kneaded by using three-roller made of ceramic until particles of 5 µm or more, preferably, of 3 µm or more derived from the solid raw material are not observed. And then, b) organic peroxide is added to the resulting roll-kneaded material at room temperature and mixed them.

Also, the curing agent can be adjusted by mixing a) the radically polymerizable resin, c) a decomposition accelerator, e) an inorganic filler and f) a silane coupling agent, and if necessary, g) a liquid rubber, h) a rubber fine particle, by stirring mechanically and then kneading by using three-roller made of ceramic until the maximum particles of 5 µm, preferably, the particles of 3 µm or more derived from the solid raw material are not observed.

The adjustment of the sealing agent is generally performed at room temperature, and even when heating is performed, it is adjusted to be a temperature of not greater than 40° C. Heating at 40° C. or less assures the storage stability and the coating workability of the sealing agent and it is a preferable embodiment.

The material to be cured and the curing agent used as the sealing agent are separately stored in a syringe for dispenser coating or a plastic vessel which can shield the light and can be airtight. The storage temperature is generally in a range of −40° C. to 0° C., preferably −20° C. to −10° C. The range of −40° C. to 0° C. is preferred since this range provides a long storage stability. When the sealing agent is used after storage at a low temperature, the sealing agent is kept at room temperature for 2 to 3 hours until the temperature of the sealing agent reach around room temperature, and then the sealing agent can be used.

In the sealing agent of the present invention, the change rate of the resistivity of the liquid crystal, which results from the contact of 10 mass parts of the liquid crystal for 24 hours on the basis of 1 mass parts of the material to be cured and the curing agent, is in a range of 0.1 to 10 times, preferably 0.5 to 5 times, more preferably 0.8 to 2 times taking the resistivity of the original liquid crystal as 1, whereby an effectiveness of prevention from contamination to the liquid crystal becomes excellent.

The most preferred sealing agent used in the method for producing liquid crystal display cell of the present invention is one in which the material to be cured or the curing agent have E type viscosity value at 25° C. in a range of 50 to 500 Pa·s, respectively, and the difference in the viscosity between two liquids is within 10 Pa·s.

The liquid crystal display element obtained according to the method for producing liquid crystal display cell of the present invention using the sealing agent of the present invention include, for example, a TN type (Twisted Nematic) liquid crystal element or an STN type (Super Twisted Nematic) liquid crystal element which are proposed by M. Schadt and W. Helfrich, or a ferroelectric type liquid crystal element proposed by N. A. Clark and S. T. Lagerwall or a liquid display crystal element in which a thin film transistor (TFT) is provided on each pixel.

EXAMPLES

The present invention is explained below in detail with reference to examples and comparative examples, but the present invention shall not be limited thereto. Percentage and part in the example mean mass % and mass part (weight part), respectively. The methods of the evaluation done in the example and the comparative examples are as follows.

(Coating Workability Test)

The material to be cured and the curing agent in the two-components sealing agent stored in a sealed polyethylene-made vessel (including the dispenser vessel) at the freezing point or lower are each taken out and left to stand at 25° C. for 2 hours. The liquid having the temperature of 25° C. is used, and in the case of the dispenser coating, five continuous lines of 300 mm were drawn on the glass substrate at 50 mm/sec of the coating line velocity, and the coating suitability was evaluated by the resulting coating appearance as follows:

○: no sealing broken or leakage is observed, and coating performance is good

Δ: no sealing broken is not observed, but slight leakage is observed

X: cobwebbing or sealing broken is observed, and coating performance is problematic And in the case of screen printing, the screen printing performance was evaluated as follows:

○: no leakage or repetitively uneven printing is observed, and printing performance is good Δ: no sealing unevenness in a repetitive printing is observed, but the slight leakage is observed X: uneven print or plugging is observed, or the printing can not be effected (Difference in E Type Viscosity Characteristic)

The viscosity of the material to be cured and the curing agent in each of the examples, was determined at 25° C. by using an E type viscometer, and the difference in the viscosity between the material to be cured and the curing agent was calculated.

X: The viscosity difference between two liquids is 100 Pa·s or more

Δ: The viscosity difference between two liquids is less than 100 Pa·s and 30 Pa·s or more ○: The viscosity difference between two liquids is 5 Pa·s or more and less than 30 Pa·s, ◎: The viscosity difference of two liquids is less than 5 Pa·s (Change in Resistivity of the Liquid Crystal in Sealing Liquid)

The material to be cured and the curing agent in each of the examples were mixed in a mass ratio of 1:1 and the resulting sealing agent was sealed in a brown bottle in a mass ratio of the liquid crystal: the sealing agent of 1:10, and the resistivity of the liquid of the liquid crystal layer after leaving it stand in contact at room temperature for 2 hours was determined, and the change rate to the resistivity of the liquid crystal before the contamination was determined.

X(−): change in resistivity is 10 times or more

X(+): change in resistivity is less than 0.1 times

Δ: change in resistivity is 0.1 times or more and less than 0.9 times, or 2 times or more and less than 10 times ○: change in resistivity is 0.9 times or more and less than 2 times (Initial Display Quality)

As to the liquid crystal display cell prepared in the respective examples, the presence or absence of the generation of sealing pass was evaluated with a magnifying glass, and a polarizing plate was stuck on both the front side and the rear side, and the white light was irradiated from the rear side to observe the color in the vicinity of the sealing agent in the liquid crystal display cell, and judge the non-bleeding property of the sealing agent.

◎: no sealing pass is generated, no uneven display is observed within 100 μm

○: no sealing pass is generated, but slight uneven display is observed within 300 μm in terms of a distance from sealed edge of cell circumference Δ: no sealing pass is generated, but slight uneven display is observed within 300 to 500 μm in terms of a distance from sealed edge of cell circumference X: sealing pass is generated. Or though no sealing pass is generated, uneven display is extended to 500 μm or more from sealed edge, and a remarkable reduction in display function is caused (Display Quality Durability)

The liquid crystal display cell in the respective examples was taken out after leaving it standing for 500 hours and 1000 hours, respectively under the environment of 65° C./RH 95%, and a polarizing plate was stuck on both the front side and the rear side, and the white light was irradiated from the rear side to observe the color in the vicinity of the sealing agent in the liquid crystal display cell, and the evaluation of the display quality durability was made by the size of the uneven display as shown below:

◎: no uneven display is observed within 200 μm

○: slight uneven display is observed within 500 μm in terms of a distance from sealed edge of cell circumference Δ: slight uneven display is observed within 500 to 700 μm in terms of a distance from sealed edge of cell circumference X: uneven display is extended to 700 μm or more from sealed edge, and a remarkable reduction in display function is caused (Raw Materials Used)

a) Radically polymerizable resin a-1) As an acrylate resin A1) to A6) were used.

A1) Bisphenol A type epoxydimethacrylate: A resin, having a polystyrene reduced-number average molecular weight of 545 and the resistivity of $5 \times 10^{10}$ Ω·cm, with a good electrical insulating property A2) Rubber fine particle-containing epoxydimethacrylate (Synthetic Example 1)

A3) Rubber fine particle-containing plastic epoxydimethacrylate (Synthetic Example 2)

A4) Bisphenol A type epoxymonomethacrylate (Comparative Synthetic Example 1)

A5) PO modified bisphenol A type epoxydimethacrylate: The product of transesterification of 2 moles of methylmethacrylate with 1 mole of modified bisphenol A type liquid epoxy resin modified by the additional application of epichlorohydrin to the modified product prepared by the addition of 6 moles of propylene oxide to 1 mole of bisphenol A, which is a resin purified by water-washing until the ion conductivity of the extracted water is 1 mS/m or less, having a polystyrene reduced-number average molecular weight of 900 and the resistivity of 9×10$^9$ Ω·cm, with a good electrical insulating property A6) Trimethylolpropane triacrylate: A resin purified by water-washing until the ion conductivity of the extracted water is 1 mS/m or less, having a polystyrene reduced-number average molecular weight of 250 and the resistivity of 2×10$^{11}$ Ω·cm, with a good electrical insulating property.

Synthetic Example 1

Rubber Fine Particle-Containing Epoxydimethacrylate (A2)

500 g of Epiclon 830S and 100 g of Adeca EP 4000S as bifunctional epoxy resins, 10 g of methacrylic acid, 1 g of triethanolamine, 50 g of toluene were added into a 2000 ml four neck flask equipped with a stirrer, a gas inlet tube, a thermometer and a cooling tube, and were reacted at 120° C. for 1 hour while introducing air to introduce a double bond to the resin. Next, 350 g of butyl acrylate, 20 g of glycidyl methacrylate, 1 g of divinylbenzene, 1 g of azobisdimethylvaleronitrile and 2 g of azobisisobutyronitrile were added thereto, and were reacted at 70° C. for 3 hours and further at 90° C. for 1 hour, while introducing nitrogen into the reaction system, to obtain a rubber fine particle containing-epoxy resin composition in which a micro cross-linking type acryl rubber fine particle having a particle diameter of 0.5 μm was homogenously dispersed as h) a rubber fine particle. Then, 500 parts of the resulting composition was placed in a separate four neck flask of 2000 ml equipped with a stirrer, a gas inlet tube, a thermometer and a cooling tube, and then 120 g of methacrylic acid previously prepared was further added thereto so as to contain 1000 ppm of phenol thiazine, and were reacted at 120° C. for 18 hours while introducing air thereto. 100 g of ultra-pure water obtained by the ion exchange method was added to the reaction product system and mixed them for 10 minutes and then, the reactants were left to stand to separate the resulting two layer, thereby the lower layer was removed, such operation being repeated three times. The removal of the solvent was completed at 80° C. under high vacuum to obtain a rubber fine particle containing-epoxy dimethacrylate in which a micro cross-linking type acryl rubber fine particle having a particle diameter of 0.5 μm was homogenously dispersed.

The polystyrene-reduced number average molecular weight of the epoxy dimethacrylate component showing a sea phase, i.e., a continuous phase, was 2200. Also, the resistivity thereof was 7×10$^9$ Ω·cm, showing a good electrical insulating property. The particle diameter of the dispersed rubber particle was determined by a method in which a portion of the above composition was quickly cured at a low temperature in the presence of a photocuring catalyst and a breaking face morphology of the cured matter thereof was observed under an electron microscope to determine a particle diameter of the dispersed rubber particle. The content of the micro cross-linking type acryl rubber fine particle which was calculated from the amounts of the charged monomers and the residual monomers was 29.5 mass %.

Also, the softening point temperature of the micro cross-linking type acryl rubber fine particle which was determined by subjecting the above cured epoxydimethacrylate resin composition product to TBA (Torosinal Grade Analyzer) was −42° C.

Synthetic Example 2

Rubber Fine Particle-Containing Plastic Epoxydimethacrylate (A3)

1000 g of Adeca EP 4023S as bifunctional plastic epoxy resins, 9.4 g of methacrylic acid, 0.4 g of triethanolamine, 100 g of toluene were added into a 2000 ml four neck flask equipped with a stirrer, a gas inlet tube, a thermometer and a cooling tube was charged with, and were reacted at 120° C. for 1 hour while introducing air to introduce a double bond to the resin. Next, 520 g of 2-ethylhexyl acrylate, 12 g of glycidyl methacrylate, 4 g of divinylbenzene, 2 g of azobisdimethylvaleronitrile and 2 g of azobisisobutyronitrile were added thereto, and were reacted at 70° C. for 3 hours and further at 90° C. for 1 hour, while introducing nitrogen into the reaction system, to obtain a rubber fine particle containing-plastic epoxy resin composition in which a micro cross-linking type acryl rubber fine particle having a particle diameter of 0.8 μm as a rubber fine particle was homogenously dispersed. Then, 825 parts of the resulting composition was placed in a separate four neck flask of 2000 ml equipped with a stirrer, a gas inlet tube, a thermometer and a cooling tube, 63.5 g of methacrylic acid previously prepared was further added thereto so as to contain 1000 ppm of hydroquinone, and were reacted at 120° C. for 15 hours while introducing air thereto. 100 g of ultra-fine water obtained by the ion exchange method was added to the reaction product system and mixed them for 10 minutes and then, the reactants were left to stand to separate the resulting two layer, thereby the lower layer was removed, such operation being repeated three times. The removal of the solvent was completed at 80° C. under high vacuum to obtain a rubber fine particle containing-plastic epoxy dimethacrylate in which a micro cross-linking type acryl rubber fine particle having a particle diameter of 0.8 μm was homogenously dispersed.

The polystyrene-reduced number-average molecular weight of the epoxy dimethacrylate component showing a sea phase of the rubber fine particle containing-plastic epoxydimethacrylate, was 4550. Also, the resistivity thereof was 3×10$^9$ Ω·cm, resulting in it having a good electrical insulating property. The particle diameter of the dispersed rubber particle was measured by a method in which the portion of the above composition was quickly cured at a low temperature in the presence of a photocuring catalyst and a breaking face morphology of the cured product thereof was observed under an electron microscope. The content of the micro cross-linking type acryl rubber fine particle which was calculated from the amounts of the charged monomers and the residual monomers was 32.2 mass %.

The softening point temperature of the micro cross-linking type acryl rubber fine particle which was determined by subjecting the above cured epoxydimethacrylate resin composition product to TBA was −51° C.

Comparative Synthetic Example 1

Epoxymonomethacrylate (A4)

200 g of bisphenol A type epoxy resin (Epiclon EXA850CRP manufactured by Dainippon Ink and Chemicals, Inc.), 50 g of methacrylic acid, 0.2 g of triethanolamine, 100 g of toluene were added into a 500 ml four neck flask equipped with a stirrer, a gas inlet tube, a thermometer and a cooling tube, and were heated by stirring at 110° C. for 5 hours while bubbling the dry air and then cooled to room temperature. 90 g of Toluene and 100 g of purified water were added to the reaction product system and mixed for 10 minutes and then, the reactants were left to stand to separate the resulting two layer, thereby the lower layer was removed, such operation being repeated three times. The removal of the solvent was completed at 80° C. under high vacuum to obtain epoxymonomethacrylate whose one methacrylate group is incorporated on an average in one molecule. The polystyrene-reduced number average molecular weight of the above epoxymonomethacrylate, was 460. The resistivity thereof was $2\times10^{10}$ $\Omega\cdot cm$, showing a good electrical insulating property.

a-2) Allyl Type Resin

The following resins were used as allyl type resin.

Triethylene glycol diallylcarbonate was used as a polyvalent allylcarbonate, of which the reduced number-average molecular weight was 320 and the resistivity was $8\times10^{8}\Omega\cdot cm$, diallylphthalate was used as a polyvalent allylphthalate, of which the reduced number-average molecular weight was 245 and the resistivity was $7\times10^{9}$ $\Omega\cdot cm$, pentaerythritol triallyl ether was used as a polyvalent allylether, of which the reduced number-average molecular weight was 257 and the resistivity was $4\times10^{7}$ $\Omega\cdot cm$.

b) Organic Peroxide

Cumene hydroperoxide, a product manufactured by Mitsui Chemicals, Inc.

c) Decomposition Accelerator

Dimethylthiourea, tetramethylthiourea, dibutylthiourea, benzoylthiourea, acetylthiourea, ethylenethiourea, diethylenethiourea, and mercaptobenzimidazoline, as a reagent.

d) Polyvalent Mercapto Compound

Pentaerythritoltetrakis(3-mercaptopropionate), refined until the ion conductivity of the extracted water is 0.5 mS/m or less, wherein the compound is rinsed three times with the same volume of purified water and then, dried under vacuum.

e) Inorganic Filler

As an amorphous silica, a product of a brand name "MU-120" (average primary particle size determined by observation under an electron microscope is 0.07 μm) manufactured by Shin-Etsu Chemical Co., Ltd.; as an amorphous alumina, high purity alumina powder of a brand name "AL-2 (abbreviated name)" produced by the dry-surface treatment using gamma-methacrylolypropyltrimethoxysilane as f) silane coupling agent (6 mass %/(an amorphous alumina+f) silane coupling agent), of which $d^{50}$ is 0.2 μm are prepared, respectively.

f) Silane Coupling Agent

Gamma-isocyanatopropyltriethoxysilane (brand name Y-9030; a product manufactured by Nihon Unika Co., Ltd.) was used.

Example 1

60 Parts of epoxydimethacrylate (A1) and 40 parts of PO modified bisphenol A type epoxydimethacrylate (A5), as a) radically polymerizable resin, 1 part of titanium white and 2 parts of an amorphous silica, MU-120, and 50 parts of an amorphous alumina, AL-2, as e) inorganic filler, and 2 parts of Y-9030 as f) silane coupling agent were pre-mixed by using a Dalton mixer and then kneaded by using a ceramic-made three roll mill until particles of the solid materials were pulverized to 3 μm or less, and then, 5 parts of cumene hydroperoxide as b) organic peroxide was added on the basis of 100 mass parts of the kneaded product and stirred, and finally, the resulting material was subjected to vacuum degassing treatment to obtain a material to be cured.

A composition comprising 60 parts of epoxydimethacrylate (A1) and 40 parts of PO modified bisphenol A type epoxydimethacrylate (A5), as a) radically polymerizable resin, 1 part of titanium white and 2 parts of an amorphous silica, MU-120, and 50 parts of an amorphous alumina, AL-2, as e) inorganic filler, 2 parts of Y-9030 as f) silane coupling agent and 9 parts of tetramethylthiourea as c) decomposition accelerator was pre-mixed by using a Dalton mixer. Then, it was kneaded by using a ceramic-made three roll mill until the solid materials were pulverized to 3 μm or less, and then, said composition was subjected to vacuum degassing treatment to obtain a curing agent.

The material to be cured comprises a) component 61.44 mass %, b) component 4.77 mass %, e) component 32.56 mass % and f) component 1.23 mass %.

The curing agent comprises a) component 60.98 mass %, c) component 5.49 mass %, e) component 32.31% and f) component 1.22 mass %.

The adjusted coating workability test results, the difference in E type viscosity characteristic and change characteristic of resistivity to the liquid crystal RC 4087, manufactured by Chisso Corporation, for each of the material to be cured and the curing agent, are shown in Table 1.

Then, separate cylindrical syringe of 20 ml made of opaque polyethylene were charged with 10 ml of each of the material to be cured and the curing agent, and the contents in the syringes were further degassed and set in a dispenser coating machine (Short Master: manufactured by Musashi Engineering Co., Ltd.).

In three sets of two sheets of glass substrates which completed pretreatment and provided with transparent electrodes, an alignment film and black matrix, the sealing portion of the front substrate was masked, 4.5 μm of spherical silica particles as a gap-forming controller were sprayed and heated at 120° C. for 30 minutes.

The material to be cured and the curing agent are evenly applied to the sealing portion of the substrate on the rear side and on the sealing portion of the substrate on the front side, respectively, in a frame pattern with width of 0.25±0.02 mm.

The substrate on the rear side was located downward and the substrate on the front side was located upward, and 2 drops of the liquid crystal RC 4087, manufactured by Chisso Corporation in the calculated theoretical amount were dropped on around the central portion in the sealing frame of the substrate on the rear side, thereafter the air was evacuated to reach a vacuum degree of 50 Pa, and then the pair of substrates were slowly laminated for 10 seconds, and the liquid crystal was sealed thereto. Thereafter, it was pressed for 5 seconds until the width of gap was up to 4.5 μm, and was left to stand for 10 minutes, and the substrates to be paired were tentatively stuck. When the press was opened, the sealing width reached around 1 mm of the width, and the sealing portion within 0.8 mm of the width thereof was positioned in a shielded situation due to the black matrix. The curing and incubating process at room temperature for 2 to 4 hours provided three sets of glass-made liquid crystal display cell (W1). It was clearly shown that in the resulting cell, no sealing pass nor the bleeding of the sealing agent was generated, and also no leakage of the liquid crystal was generated.

The initial display quality and the display quality durability test results as to the obtained W1 cell are shown in Table 1.

In the method for producing the liquid crystal display cell, glass-made liquid crystal display cell (W1-2) was obtained in the same manner as described above, except that the material to be cured and the curing agent are evenly applied to the sealing portion of the substrate on the rear side and on the sealing portion of the substrate on the front side, respectively, in a frame pattern under the screen printing conditions using a 450 mesh screen. It was shown that in the resulting cell, no sealing pass nor the bleeding of the sealing agent was generated at all, and also no leakage of the liquid crystal was generated at all. Also, the display quality of W1-2 in a finished form was ⊚.

Example 2

The material to be cured and the curing agent were each obtained in the same manner as in Example 1, except that 70 parts of rubber fine particle containing-epoxydimethacrylate (A2) and 30 parts of PO modified bisphenol A type epoxydimethacrylate (A5) were used as a) radically polymerizable resin. Coating workability test results, the difference in E type viscosity characteristic and change characteristic of resistivity to the liquid crystal RC 4087, manufactured by Chisso Corporation, for each of the material to be cured and the curing agent, are shown in Table 1.

The material to be cured comprises 48.78 mass % of a) component, 4.77 mass % of b) component, 32.56 mass % of e) component, 1.23 mass % of f) component, and 12.66 mass % of h) component.

The curing agent comprises 48.39 mass % of a) component, 5.49 mass % of c) component, 32.31% of e) component, 1.22 mass % of f) component, and 12.59 mass % of h) component.

Also, the liquid crystal display cell was also produced in the same manner as described in Example 1 following the operations that separate cylindrical syringes of 20 ml made of opaque polyethylene were charged with 10 ml of each of the material to be cured and the curing agent, and the contents in the syringes were further degassed and set in a dispenser coating machine. Three sets of glass-made liquid crystal display cell (W2) were obtained. It was clearly shown that in the resulting cell, no sealing pass nor bleeding of the sealing agent was generated at all, and also no leakage of the liquid crystal was observed at all.

The initial display quality and the display quality durability test results as to the obtained W2 cell are shown in Table 1.

Example 3

The material to be cured and the curing agent were each obtained in the same manner as in Example 1, except that 50 parts of epoxydimethacrylate (A1) and 50 parts of rubber fine particle-containing plastic epoxydimethacrylate (A5) were used as a) radically polymerizable resin. Coating workability test results, the difference in E type viscosity characteristic and change characteristic of resistivity to the liquid crystal RC 4087, manufactured by Chisso Corporation, for each of the material to be cured and the curing agent are shown in Table 1.

The material to be cured comprises 51.55 mass % of a) component, 4.77 mass % of b) component, 32.56 mass % of e) component, 1.23 mass % of f) component, and 9.87 mass % of h) component.

The curing agent comprises 51.16 mass % of a) component, 5.49 mass % of c) component, 32.31% of e) component, 1.22 mass % of f) component and 9.82 mass % of h) component.

The liquid crystal display cell was produced in the same manner as described in Example 1 following the operations that separate cylindrical syringes of 20 ml made of opaque polyethylene were charged with 10 ml of each of the material to be cured and the curing agent, and the contents in the syringes were further degassed and set in a dispenser coating machine, except that the 3 Volt-driving liquid crystal for TFT element, manufactured by Chisso Corporation was substituted for the liquid crystal RC 4087 manufactured by Chisso Corporation used in the Example 1. Three sets of liquid crystal display cell (W3) were obtained. It was clearly shown that in the resulting cell, no sealing pass nor the bleeding of the sealing agent was generated at all, and also no leakage of the liquid crystal was observed at all. The initial display quality and the display quality durability test results as to the obtained W3 cell are shown in Table 1.

Example 4

The material to be cured and the curing agent were each obtained in the same manner as described in Example 1, except that as a) radically polymerizable resin, 40 parts of epoxydimethacrylate (A1), 50 parts of rubber fine particle containing-plastic epoxydimethacrylate (A3) and 5 parts of trimethylolpropanetriacrylate (A6), as radically polymerizable monomer having poor volatility, 7 parts of 2-hydroxypropyl methacrylate (reagent•special grade) and 3 parts of methacrylic acid (reagent•special grade) were used. Coating workability test results, the difference in E type viscosity characteristic at 20° C. and change characteristic of resistivity to the liquid crystal RC 4087, manufactured by Chisso Corporation, for each of the material to be cured and the curing agent are shown in Table 1.

The material to be cured comprises 51.54 mass % of a) component comprising radically polymerizable monomer having a poor volatility, 4.77 mass % of b) component, 32.56 mass % of e) component, 1.23 mass % of f) component and 9.9 mass % of h) component.

The curing agent comprises 51.16 mass % of a) component comprising radically polymerizable monomer having poor volatility, 5.49 mass % of c) component, 32.31% of e) component, 1.22 mass % of f) component, and 9.82 mass % of h) component.

Also, the liquid crystal display cell was produced in the same manner as described in Example 1 following the operations that separate cylindrical syringes of 20 ml made of opaque polyethylene were charged with 10 ml of each of the material to be cured and the curing agent, and the contents in the syringes were further degassed and set in a dispenser coating machine. Three sets of liquid crystal display cell (W4) were obtained. It was clearly shown that in the resulting cell, no sealing pass nor the bleeding of the sealing agent was generated at all, and also no leakage of the liquid crystal was observed at all. The initial display quality and the display quality durability test results as to the obtained W4 cell are shown in Table 1.

Example 5

As a) radically polymerizable resin, 50 parts of epoxydimethacrylate (A1), 30 parts of PO modified bisphenol A type epoxydimethacrylate (A5), and 5 parts of trimethylolpropanetriacrylate (A6), as radically polymerizable monomer with poor volatility, 7 parts of 2-hydroxyethylacrylate (reagent•special grade) and 3 parts of methacrylic acid (reagent•special grade), as h) and i) components, 10 parts of core-shell-like fine particle, F-351, manufactured by Nippon Zeon Co., Ltd. (core part is h) rubber fine particle, and shell part is i) high softening point-acryl fine particle, and the weight ratio of core phase: shell phase is 1:1), as inorganic filler, 1 part of titanium white and 2 parts of an amorphous silica, MU-120, and 50 parts of an amorphous alumina, AL-2, and as f) silane coupling agent, 2 parts of Y-9030 were pre-mixed by using a Dalton mixer. Then, they were kneaded by using a ceramic-made three roll mill until the solid materials were pulverized to 3 μm or less, and then, 5 parts of cumene hydroperoxide as b) organic peroxide was added on the basis of 100 mass parts of the kneaded product and stirred, and finally, the resulting material was subjected to vacuum degassing treatment to obtain a material to be cured.

On the other hand, a composition comprising as a) radically polymerizable resin, 50 parts of epoxydimethacrylate (A1), 30 parts of PO modified bisphenol A type epoxydimethacrylate (A5), and 5 parts of trimethylolpropanetriacrylate (A6), as radically polymerizable monomer having poor volatility, 7 parts of 2-hydroxyethylacrylate (reagent-special grade) and 3 parts of methacrylic acid (reagent-special grade), as h) and i) components, 10 parts of core-shell-like fine particle, F-351, manufactured by Nippon Zeon Co., Ltd. as mentioned above, as e) inorganic filler, 1 part of titanium white, 2 parts of an amorphous silica, MU-120, and 50 parts of an amorphous alumina of AL-2, as f) silane coupling agent, 2 parts of Y-9030, and as c) decomposition accelerator, 9 parts of tetramethylthiourea were pre-mixed by using a Dalton mixer, and then, were kneaded by using a ceramic-made three roll mill until the solid materials were pulverized to 3 μm or less. Finally, the above composition was subjected to vacuum degassing treatment to obtain a curing agent.

Coating workability test results, the difference in E type viscosity characteristic at 20° C. and change characteristic of resistivity to the liquid crystal RC 4087, manufactured by Chisso Corporation, for each of the material to be cured and the curing agent are shown in Table 1.

The material to be cured comprises a) 55.30 mass % of component comprising radically polymerizable monomer with poor volatility, 4.77 mass % of b) component, 32.56 mass % of e) component, 1.23 mass % of f) component, 3.07 mass % of h) component, and 3.07 mass % of i) high softening point-acryl fine particle. The curing agent comprises 54.88 mass % of a) component comprising radically polymerizable monomer having poor volatility, 5.49 mass % of c) component, 32.31% of e) component, 1.22 mass % of f) component, 3.05 mass % of h) component and 3.05 mass % of i) high softening point-acryl fine particle.

Also, the liquid crystal display cell was produced in the same manner as described in Example 1 following the operations that separate cylindrical syringes of 20 ml made of opaque polyethylene were charged with 10 ml of each of the material to be cured and the curing agent, and the contents in the syringes were further degassed and set in a dispenser coating machine. Three sets of liquid crystal display cell (W5) were obtained. It was clearly shown that in the resulting cell, no sealing pass nor the bleeding of the sealing agent was generated at all, and also no leakage of the liquid crystal was observed at all.

The initial display quality and the display quality durability test results as to the obtained W5 cell are shown in Table 1.

Example 6

The material to be cured and the curing agent constituting the acrylate two-components sealing agent were each obtained in the same manner as described in Example 2, except that as c) decomposition accelerator, 1 part of dimethylthiourea, 1 part of dibutylthiourea, 1 part of acetylthiourea and 6 parts of benzoylthiourea were used.

Coating workability test results, the difference in E type viscosity characteristic and change characteristic of resistivity to the liquid crystal RC 4087, manufactured by Chisso Corporation, for each of the material to be cured and the curing agent are shown in Table 1.

Also, the liquid crystal display cell was produced in the same manner as described in Example 1 following the operations that separate cylindrical syringes of 20 ml made of opaque polyethylene were charged with 10 ml of each of the material to be cured and the curing agent, and the contents in the syringes were further degassed and set in a dispenser coating machine. Three sets of liquid crystal display cell (W6) were obtained. It was clearly shown that in the resulting cell, no sealing pass nor the bleeding of the sealing agent was generated at all, and also no leakage of the liquid crystal was observed at all. The initial display quality and the display quality durability test results as to the obtained W6 cell are shown in Table 1.

Example 7

The material to be cured and the curing agent were each obtained in the same manner as described in Example 2, except that as c) decomposition accelerator, 2 part of ethylenethiourea, 2 part of diethylenethiourea and 5 parts of mercaptobenzimidazole were used.

Coating workability test results, the difference in E type viscosity characteristic at 20° C. and change characteristic of resistivity to the liquid crystal RC 4087, manufactured by Chisso Corporation, for each of the material to be cured and the curing agent are shown in Table 2.

Also, the liquid crystal display cell was produced in the same manner as described in Example 1 following the operations that separate cylindrical syringes of 20 ml made of opaque polyethylene were charged with 10 ml of each of the material to be cured and the curing agent, and the contents in the syringes were further degassed and set in a dispenser coating machine. Three sets of liquid crystal display cell (W7) were obtained. It was clearly shown that in the resulting cell, no sealing pass nor the bleeding of the sealing agent was generated at all, and also no leakage of the liquid crystal was observed at all. The initial display quality and the display quality durability test results as to the obtained W7 cell are shown in Table 2.

Example 8

60 Parts of triethyleneglycol diallylcarbonate (A2), 5 parts of pentaerythritol triallylether, and 5 parts of diallylphthalate, as a-2) allyl resin, 30 parts of pentaerythritol tetrakis(3-mercaptopropionate) as d) polyvalent mercapto compound, 10 parts of an amorphous silica, MU-120, and 88 parts of a spherical silica, SO-E1-6, as e) inorganic filler, and 2 parts of Y-9030 as f) silane coupling agent were pre-mixed by using a Dalton mixer and then kneaded by using a ceramic-made three roll mill until the solid materials were pulverized to 3 μm or less. Then, 10 mass parts of cumene hydroperoxide as b) organic peroxide was added on the basis of 100 mass parts of the kneaded product and stirred, and finally, the resulting material was subjected to vacuum degassing treatment to obtain a material to be cured.

60 Parts of triethyleneglycol diallylcarbonate, 5 parts of pentaerythritol triallylether, and 5 parts of diallylphthalate, as a-2) allyl resin, 30 parts of pentaerythritol tetrakis(3-mercaptopropionate) as d) polyvalent mercapto compound, 10 parts of an amorphous silica, MU-120 and 88 parts of a spherical silica, SO-E1-6, as e) inorganic filler, and 2 parts of Y-9030 as f) silane coupling agent were pre-mixed by using a Dalton mixer, and then, it was kneaded by using a ceramic-made three roll mill until the solid materials were pulverized to 3

μm or less. 15 parts of tetramethylthiourea as c) decomposition accelerator on the basis of 100 mass parts of the kneaded product was pre-mixed by using a Dalton mixer, and then, it was kneaded by using a ceramic-made three roll mill until the solid materials were pulverized to 3 μm or less, and the above composition was subjected to vacuum degassing treatment, to obtain a curing agent.

The material to be cured comprises 45.46 mass % of a) radically polymerizable resin represented by the sum of the allyl type resin and the polyvalent mercapto compound, 9.09 mass % of b) organic peroxide, 44.55 mass % of e) inorganic filler, and 0.9 mass % of f) silane coupling agent.

The curing agent comprises 43.48 mass % of a) component represented by the sum of the allyl type resin and the polyvalent mercapto compound, 13.04 mass % of c) component, e) component 42.61%, and 0.87 mass % of f) component.

Coating workability test results, the difference in E type viscosity characteristic, and change characteristic of resistivity to the liquid crystal RC 4087 manufactured by Chisso Corporation, for each of the material to be cured and the curing agent of two-components sealing agent of which the base resin is an allyl type resin are shown in Table 2.

Also, three sets of the liquid crystal display cell (W8) were produced in the same manner as described in Example 1 following the operations that separate cylindrical syringe of 20 ml made of opaque polyethylene were charged with 10 ml of each of the material to be cured and the curing agent, and the contents in the syringes were further degassed and set in a dispenser coating machine (Short Master: manufactured by Musashi Engineering Co., Ltd.) except that the glass substrate was replaced with the plastic substrate comprising the polycarbonate substrate as a base, having the same size as the former, manufactured by Teijin Corporation and that the first setting time for the gel-forming was changed to 60 minutes. It was clearly shown that in the resulting cell, sealing pass or the bleeding of the sealing agent was not generated, and also the leakage of the liquid crystal was not generated.

The initial display quality and the display quality durability test results as to the obtained W8 cell are shown in Table 2.

Comparative Example 1

30 parts of bisphenol F type liquid epoxy resin, 70 parts of epoxymonomethacrylate (A4) and 28 parts of trimethyloylpropanetriacrylate (A6), as a) radically polymerizable resin, 5 parts of an amorphous silica, MU-120, and 45 parts of talc having an average particle diameter ($d^{50}$) of 1 μm, which is determined by the weight integration curve, as e) inorganic filler, and 2 parts of Y-9030 (brand name; a product manufactured by Nihon Unika Co., Ltd.), as f) silane coupling agent and 1 part of 2-phenyl-4-methylimidazole as epoxy curing agent were pre-mixed by using a Dalton mixer and then kneaded by using a ceramic-made three roll mill until the solid materials were pulverized to 3 μm or less. Thereafter, 2 parts of 1-hydroxycyclohexylphenylketone photoinitiator was added on the basis of 100 mass parts of the kneaded product and stirred, and finally, the resulting material was subjected to vacuum degassing treatment to obtain a one-component sealing agent having both photocuring and thermosetting properties.

Then, for the purpose of the dispenser coating, a one-component sealing agent was charged into cylindrical syringes of 20 ml made of opaque polyethylene by 10 ml, and the contents was set in a dispenser coating machine (Short Master: manufactured by Musashi Engineering Co., Ltd.). Then, the pretreatment which is required to provide transparent electrodes, an alignment film and a black matrix was completed. Three sets of two sheets of facing glass substrates for the liquid crystal display element cleaned by completion of the pretreatment were used. The size of the substrates was 1 inch. Then the sealing portion of the front substrate was masked, 4.5 μm of spherical silica particles as a gap-forming controller were sprayed and heated at 120° C. for 30 minutes to perform the surface treatment of the front substrate.

On the sealing portion of the substrate on the rear side as a base substrate, one-component sealing agents were each evenly applied in a frame pattern at a width of 0.3±0.02 mm as the width of the line of the uncured sealing agent line.

The substrate on the rear side was located downward and the substrate in the front side was located upward, and 2 drops of the liquid crystal RC 4087, manufactured by Chisso Corporation in the calculated theoretical amount were dropped around the central portion in the sealing frame of the substrate in the rear side, thereafter the air was evacuated to reach the vacuum degree of 10 Pa, the facing substrates were slowly bonded for 10 seconds, and the liquid crystal was sealed thereto. Thereafter, it was subjected to pressure for 5 seconds until the width of gap was 4.5 μm, thereby the sealed width reached 1 mm. The sealing portion within 0.75 mm of the width thereof was left in a shielded situation due to the black matrix. 1000 mJ/cm² of the integrated UV light was irradiated using a high pressure mercury lamp, and thermosetting was initiated immediately after evacuation was broken at 120° C. for 90 minutes to produce three sets of liquid crystal display cell (X1) for comparison. In all three cells, distortion of the liquid crystal-orientation was generated within a wide range of 1 to 3 mm of the cured portion, and in one of the three cells, leakage of the liquid crystal from the left edge which was surrounded in black matrix, was observed. The initial display quality and the display quality durability test results as to the obtained X1 are shown in Table 2.

The phenomenon, i.e., distortion of the liquid crystal-orientation as mentioned above, suggested the fact that such distortion was not generated after completion of the photo-curing process by means of irradiation of UV light, but was generated during thermosetting process at 120° C. for 90 minutes, and at the time of heating at 120° C., the sealed liquid crystal was remarkably contaminated with the components of the uncured sealing agent.

Furthermore, from the additional experiment, it was surprisingly found that in the display quality of 3 cells produced by the photocuring process with the integrated irradiation of UV light of 5 to 8 J/cm² using the high pressure mercury lamp, a remarkably poor orientation areas (within 1 to 5 mm from the sealed edge) were found, after standing at 60° C. for 24 hours and after standing under an environment of relative humidity RH95% at 45° C. Also, in the shear-strength of the seal-cutting, it was almost 5 to 7% of that obtained when the thermosetting process is concomitantly used, and thus, only the liquid crystal display cells of little practicability were obtained.

Comparative Example 2

As a) radically polymerizable resin, 70 parts of epoxymonomethacrylate (A4) and 28 parts of PO modified phenol A type epoxydimethacrylate (A5), as e) inorganic filler, 5 parts of an amorphous silica, MU-120 and 45 parts of talc having an average particle diameter ($d^{50}$) of 1 μm, which is determined by the weight integration curve, and as f) silane coupling agent, 2 parts of Y-9030 (brand name; a product manufactured by Nihon Unika Co., Ltd.) were pre-mixed by using a Dalton mixer and then kneaded by using a ceramic-made three roll mill until the solid materials were pulverized to 3 μm or less. Then, 2 parts of 1-hydroxycyclohexylphenylketone photoinitiator was added on the basis of 100 mass parts of the kneaded product and stirred, and finally, the resulting material was subjected to vacuum degassing treatment to obtain a one-component sealing agent having the photocuring property.

Then, for the purpose of the dispenser coating, a one-component sealing agent was charged into cylindrical syringes of 20 ml made of opaque polyethylene by 10 ml, and the contents was set in a dispenser coating machine (Short Master: manufactured by Musashi Engineering Co., Ltd.). Then, the pretreatment which is required to provide transparent electrodes, an alignment film and a black matrix was completed. Three sets of two sheets of facing glass substrates for the liquid crystal display element cleaned by completion of the pretreatment were used. The size of the substrates was 1 inch. And then the sealing portion of the front substrate was masked, 4.5 μm of spherical silica particles as a gap-forming controller were sprayed and heated at 120° C. for 30 minutes to perform the surface treatment of the front substrate.

Then, on the sealing portion of the substrate on the rear side, one-component sealing agents were each evenly applied in a frame pattern at a width of 0.3±0.02 mm as the line-width of the uncured sealing agent.

The substrate on the rear side was located downward and the substrate in the front side was located upward, and the liquid crystal RC 4087, manufactured by Chisso Corporation in the calculated theoretical amount was added dropwise on the central portion in the sealing frame of the substrate on the rear side, thereafter the air was evacuated to reach a vacuum of 10 Pa, and then the facing substrates were slowly bonded for 10 seconds, and the liquid crystal was sealed thereto. Thereafter, it was subjected to pressure for 5 seconds until the width of gap was up to 4.5 μm, thereby the sealed width reached 1 mm. The sealing portion within 0.75 mm of the width thereof was left in a shielded situation by the black matrix. The integrated UV light of 5000 of mJ/cm$^2$ was irradiated by using the high pressure mercury lamp, and thermosetting was initiated immediately after the evacuation was broken at 100° C. for 60 minutes to produce three sets of liquid crystal display cell (X2) for the comparison. As a result, in all of the three cells, the bleeding of the sealing or sealing pass were generated and in particular, the leakage of the liquid crystal from around the lower part of the transparent electrode and the lower part of black matrix, was observed.

The initial display quality test results as to the obtained X2 are shown in Table 2, however the display quality durability test was not performed.

TABLE 1

| | Example No. Example | | | | | | |
|---|---|---|---|---|---|---|---|
| | 1 | 2 | 3 | 4 | 5 | 6 | |
| Coating workability test results | | ○ | ○ | ○ | ○ | ○ | ○ |
| Difference in E type viscosity characteristic at 25° C. | ◎ | | ◎ | ◎ | ◎ | ◎ | ◎ |
| Change characteristic of resistivity of the liquid crystal | ○ | | ○ | ○ | ○ | ○ | ○ |
| No. of the liquid crystal display cell | W1 | W1–2 | W3 | W4 | W5 | W6 | W6 |
| Initial display quality | ◎ | ◎ | ◎ | ◎ | ◎ | ◎ | ◎ |
| Presence or absence of sealing pass | absence | absence | absence | absence | absence | absence | absence |
| Presence or absence of the bleeding of the sealing | absence | absence | absence | absence | absence | absence | absence |
| Presence or absence of the leakage of the liquid crystal | absence | absence | absence | absence | absence | absence | absence |
| Test results for display quality durability | | | | | | | |
| After 500 hours | ◎ | ◎ | ◎ | ◎ | ◎ | ◎ | ◎ |
| After 1000 hours | ○ | ○ | ○ | ○ | ○ | ○ | ○ |

TABLE 2

| | Example | Example | Comparative Example | |
|---|---|---|---|---|
| Example No. | 7 | 8 | 1 | 2 |
| Coating workability test results | ○ | ○ | ○ | ○ |
| Difference in E type viscosity characteristic at 25° C. | ◎ | ◎ | — | — |
| Change characteristic of resistivity of the liquid crystal | ○ | ○ | ○ | ○ |
| No. of the liquid crystal display cell | W7 | W8 | X1 | X2 |
| Initial display quality | ◎ | ○ | X | Δ |

TABLE 2-continued

|  | Example | Example | Comparative Example | |
|---|---|---|---|---|
| Example No. | 7 | 8 | 1 | 2 |
| Presence or absence of sealing pass | absence | absence | absence | presence |
| Presence or absence of the bleeding of the sealing | absence | absence | absence | presence |
| Presence or absence of the leakage of the liquid crystal | absence | absence | absence | presence |
| Test results for display quality durability |  |  |  |  |
| After 500 hours | ◎ | ○ | X | not effected |
| After 1000 hours | ○ | Δ | X |  |

Comparative example 1, based on Japanese Unexamined Patent Application Publication Nos. 5-295087 and 9-57591 and the like, is a comparative synthetic example of the liquid crystal-dropping sealing method wherein a single-liquid sealing agent having both photocuring and the thermosetting properties was used. With a photocuring process alone, only liquid crystal display cell with little practicability could be obtained. And even when light and heat were used together, the initial display quality and the display quality durability thereof were very poor, which are assumed to be a lack of curability in the light-shield part.

Comparative example 2 is a comparative synthetic example on the conventional liquid crystal-dropping sealing method wherein a single-liquid sealing agent having the photocuring property was used. Even when the curing process was performed by means of the large amount of UV light, the degree of curing of the sealing agent was poor and the leakage of sealing of the liquid crystal frequently occurred.

On the other hand, according to the method for producing liquid crystal display cell (Examples 1 to 7) of the present invention, regardless of the presence or absence of the light-shield part, liquid crystal display cell were produced in good homogenous condition with a good display quality and durability. Furthermore, the sealing agent comprising a material to be cured and a curing agent of the present invention does not contaminate the liquid crystal at all, does not cure until the substrates are laminated, and was cured at room temperature within a short time.

INDUSTRIAL APPLICABILITY

The liquid crystal display cells produced by the method for producing the liquid crystal display cell according to the present invention are homogenous and have a good display quality and durability. The sealing agent of the present invention does not need photoirradiation or long-term heating and curing process, under high temperature exceeding 100° C., and further, it can avoid thermal deterioration or deterioration due to photo-decomposition to the maximum.

According to the method for producing the liquid crystal display cell using the sealing agent of the present invention, large-sized liquid crystal display cell having excellent performance can be produced with high reproducibly.

What is claimed is:

1. A method for producing a liquid crystal display cell comprising processes of applying a sealing agent to a sealing portion of first and second liquid crystal display cell substrates, dropping liquid crystal on the first or second substrate, and bonding the first and second substrates to each other under vacuum such that the liquid crystal is sandwiched between the first and second substrates,
   wherein the sealing agent is a radically curable two-component sealing agent comprising a material to be cured and a curing agent, and is applied to the sealing portion without mixing the material to be cured and the curing agent by using a dispenser coating or a screen printing, the material to be cured is applied to the sealing portion of the first substrate, while the curing agent is applied to the sealing portion of the second substrate, and then the first and second substrates are bonded to each other under vacuum at room temperature to cure the sealing agent,
   wherein the material to be cured comprises (a) 30 to 94.4 mass % of a radically polymerizable resin consisting of an allyl resin having a polystyrene-reduced number-average molecular weight of 300 to 10000, (d) a polyvalent mercapto compound, (b) 0.5 to 10 mass % of an organic peroxide having a 10 hour-half life temperature of at least 120° C., (e) 5 to 50 mass % of an inorganic filler and (f) 0.1 to 5 mass % of a silane coupling agent, and the curing agent comprises (a) 30 to 94.4 mass % of a radically polymerizable resin consisting of an allyl resin having polystyrene-reduced number-average molecular weight of 300 to 10000, (d) a polyvalent mercapto compound, (c) 0.5 to 10 mass % of a decomposition accelerator, (e) 5 to 50 mass % of an inorganic filler and (f) 0.1 to 5 mass % of a silane coupling agent, and the mass ratio of the curing agent: the material to be cured is in a range from (3:1) to (1:3).

2. The method for producing a liquid crystal display cell according to claim 1, wherein the material to be cured and the curing agent are each independently compounded with 5 to 25 mass % of (g) a liquid rubber and/or (h) a rubber fine particulate, based on the total amount.

* * * * *